United States Patent Office 3,317,778
Patented May 2, 1967

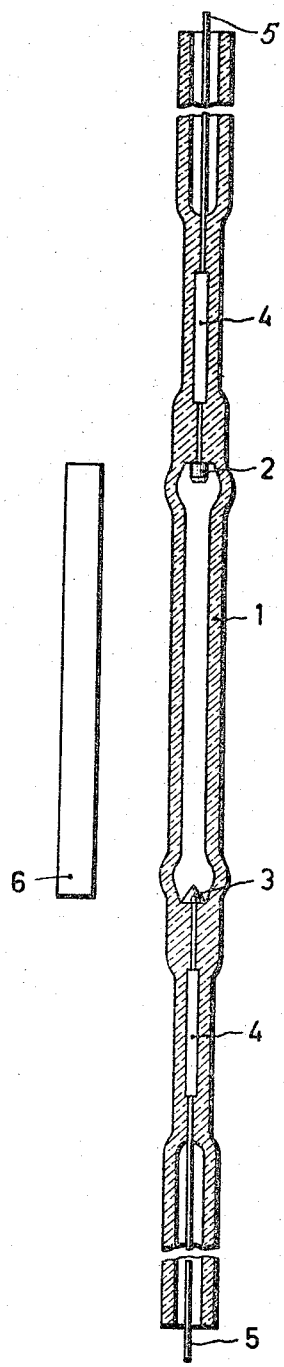
INVENTORS
ABRAHAM TIMMERMANS &
TAEKE TOL
BY
AGENT

3,317,778
GREEN RADIATION LAMP FOR
OPTICAL MASER
Abraham Timmermans and Taeke Tol, Emmasingel, Eindhoven, Netherlands, assignors to North American Philips Company, Inc., New York, N.Y., a corporation of Delaware
Filed Jan. 30, 1964, Ser. No. 341,314
Claims priority, application Netherlands, Feb. 8, 1963, 288,714
3 Claims. (Cl. 313—225)

Our invention relates to an optical maser in combination with a source of radiation. The invention further relates to such a source of radiation.

Optical masers always contain a medium in which stimulated emission can occur. The energy required for this emission must be supplied to the medium, this supply of energy being frequently referred to as "pumping." Obviously, it is of importance that the medium absorbs the maximum amount of the energy supplied. A few optical masers are already known which can absorb pumping energy lying particularly in the green part of the spectrum. Examples thereof are the laser using a crystal of ruby and the laser comprising calcium tungstenate containing neodymium.

The greater the part of the pumping energy that is absorbed by the medium, the stronger will be the stimulated emission, other things being equal. Hence, it is of importance that the pumping energy be concentrated to the highest possible degree in the effective region of absorption of the medium. For media of the kind referred to above, the effective region of absorption of which lies for a large part in the green region of the spectrum, use has generally been made of high pressure mercury vapor discharge tubes, since the latter emit a large quantity of light in the green part of the spectrum. Such tubes also emit a large quantity of radiation, however, beside the desired part of the spectrum and the energy of this radiation is practically lost for the operation of the optical maser. Consequently, the energy to be supplied to the source of radiation is used with a poor efficiency and is comparatively high.

A principal object of the invention is to provide an improved source of radiation such that the radiation emitted by this source matches more satisfactorily with the effective absorption region of the medium.

An optical maser, in accordance with the invention, comprises a medium in which stimulated emission can occur and a source of radiation for supplying to the medium the radiation energy required for the emission and lying at least in part in the green region of the spectrum, and it is characterized in that the source of radiation consists of a forced-cooled tubular super-high pressure mercury-vapor discharge lamp having an electrode spacing which is at least five times the inner diameter of the tube, and containing in addition to mercury and a noble gas, thallium and a halogen, and which satisfies the following conditions:

(a) The wall load under operating conditions lies between 200 and 1200 watts/cm.$^2$;
(b) the quantity of mercury lies between 0.5 and 5.0 mgs. per cm. of the electrode spacing;
(c) the quantity of thallium lies between 0.25 and 1.5 mgs. per cm. of the electrode spacing;
(d) the amount by weight of mercury divided by the amount by weight of thallium lies between the values 1 and 5;
(e) the quantity of halogen lies between 80% and 150% of the quantity required to bind the whole quantity of thallium in the monovalent state; and
(f) the voltage gradient lies between 80 and 300 v./cm.

Forced cooling, for example, by means of a stream of water, is necessary because of the high wall load, since this load is so high that the conventional materials used for such discharge lamps, such as vitreous quartz, cannot withstand the temperature produced without being deformed.

In order to increase the quantity of radiation in the desired green part of the spectrum, use may be made of a known super-high pressure mercury vapor discharge lamp. However, it has been found that such a lamp emits less energy in the desired region than a lamp in accordance with the invention.

It is also possible to increase the quantity of radiation in the green region by the use of known high pressure mercury-vapor discharge lamps which contain, in addition to mercury, thallium and a halogen, particularly iodine. However, it has been found that the total energy emitted by these lamps in the desired green part of the spectrum is too low to furnish a satisfactory operation of the optical maser. In such a lamp, the peaks of the mercury spectrum, and consequently also those in the desired green region, are strongly suppressed as a result of the presence of the other added elements. Hence, such discharge lamps are not very suitable for use in optical masers in accordance with the invention.

The super-high pressure mercury-vapor discharge lamp, in accordance with the invention, emits radiation having a very high peak produced by the thallium at a wavelength of 5,350 A., that is to say in the center of the green region of the spectrum. Moreover, the radiation spectrum exhibits another peak produced by the mercury at 5,461 A., that is to say also in the desired green region. Apparently, as a result of the choice of the conditions as stated above, this green radiation peak is suppressed to the least extent, so that it supplies a useful contribution to the excitation of the medium of the optical maser. It has further been found that a great part of the energy supplied to the gas discharge lamp is concentrated in the two radiation peaks at 5,350 A. and at 5,461 A.

The spectrum of thallium in a high-pressure discharge also exhibits peaks in the red part of the spectrum, that is to say at 6,549 A. and at 6,713 A. These radiation peaks are strongly suppressed in the spectrum of the radiation emitted by a gas discharge lamp in accordance with the invention. Consequently, the loss of energy in this part of the spectrum also is small.

Preferably, the conditions which a mercury-vapor discharge tube, in accordance with the invention, has to satisfy are chosen as follows:

(a) The wall load in the operative condition lies between 300 and 700 watts/cm.$^2$;
(b) the quantity of mercury lies between 0.8 and 1.5 mgs. per cm. of the electrode spacing;
(c) the quantity of thallium lies between 0.4 and 0.8 mg. per cm. of the electrode spacing;
(d) the amount by weight of mercury divided by the amount by weight of thallium lies between the values 1 and 5;
(e) the quantity of halogen lies between 80% and 150% of the quantity required to bind the whole quantity of thallium in the monovalent state;
(f) at room temperature, the noble gas has a pressure lying between 10 and 150 mms. of Hg; and
(g) the voltage gradient lies between 100 and 200 v./cm.

Gas discharge lamps, in accordance with the invention, are preferably energized with a pulsating direct current. However, they may also be energized either with a continuous direct current or with an alternating current.

A gas discharge lamp, in accordance with the invention, can be coupled in a known manner with the medium of the optical maser, i.e. the gas discharge lamp and the medium are placed at the focal lines of an elliptical reflector.

The invention will now be described more fully, by way of example, with reference to the accompanying drawing which shows, in section, one embodiment of a high-pressure mercury-vapor lamp suitable for the invention, in operative relationship with an optical maser medium.

The lamp shown in the drawing consists of a discharge vessel 1 made, for example, of vitreous quartz, in which a tungsten anode 2 and a tungsten cathode 3 are disposed. These electrodes are connected through sealed-in molybdenum strips 4 to the current supply wires 5.

The discharge space contains 3 mgs. of mercury and 1.5 mgs. of thallium iodide. The noble gas is argon and at room temperature the pressure is 60 mms. of mercury. The power of the lamp is 1000 watts and the lamp burns at an arc voltage of 450 v. Measurements have shown that with the use of this gas discharge lamp in combination with a ruby laser 6, the emission of energy by the laser was one and a half times that obtained with the use of a corresponding discharge lamp without the addition of thallium iodide.

While we have described our invention with reference to a particular embodiment and applications thereof, other modifications therein will be readily apparent to those skilled in this art without departing from the spirit and scope of the invention which is defined in the appended claims.

What we claim is:

1. A source of radiation for supplying radiation energy lying at least in part in the green region of the visible spectrum and required for emission from a medium of an optical maser comprising a forced cooled high-pressure mercury-vapor discharge lamp including a light-transmissible tubular envelope, a pair of spaced electrodes therein, and a filling of mercury, a noble gas, thallium and a halogen within the envelope for maintaining a discharge between the electrodes, said electrodes being spaced apart in said envelope a distance which is at least five times the inner diameter of the envelope, said tube having a wall load under operating conditions of between 200 and 1200 watts/cm.$^2$, said filling containing a quantity of mercury between 0.5 and 5.0 mgs./cm. of the spacing between the electrodes, the quantity of thallium present being between 0.25 and 1.5 mgs./cm. of the spacing between the electrodes, the amount by weight of mercury divided by the amount by weight of thallium being between 1 and 5, the quantity of halogen present in the filling being between 80% and 150% of the quantity required to bind the whole quantity of thallium in monovalent form, the noble gas having at room temperature a pressure between 50 and 150 mms. Hg, and the voltage gradient between the electrodes being between 80 and 300 v./cm.

2. A radiation source as claimed in claim 1 in which the halogen is iodine.

3. A radiation source as claimed in claim 1 in which the noble gas is argon.

References Cited by the Examiner
UNITED STATES PATENTS

| | | | |
|---|---|---|---|
| 1,088,740 | 3/1914 | Steinmetz | 313—229 |
| 2,765,416 | 10/1956 | Beese et al. | 313—13 |
| 2,924,731 | 2/1960 | Martt et al. | 313—43 |
| 3,234,421 | 2/1966 | Reiling | 313—225 |

OTHER REFERENCES

Simulated Optical, etc., in Nature, vol. 187, Aug. 6, 1960, pp. 493, 494.

DAVID J. GALVIN, *Primary Examiner.*